United States Patent [19]

Klein et al.

[11] Patent Number: 4,641,519

[45] Date of Patent: Feb. 10, 1987

[54] DEVICE FOR THE DETERMINATION OF ROTATIONAL SPEED

[75] Inventors: Hans-Christof Klein, Hattersheim; Ulrich Armonier; Hermann Oesterle, both of Lauf; Juergen Jendroska, Liederbach, all of Fed. Rep. of Germany

[73] Assignee: Alfred Teves GmbH, Frankfurt am Main, Fed. Rep. of Germany

[21] Appl. No.: 755,680

[22] Filed: Jul. 15, 1985

[30] Foreign Application Priority Data

Jul. 13, 1984 [DE] Fed. Rep. of Germany ....... 3425825

[51] Int. Cl.$^4$ .............................................. G01L 5/28
[52] U.S. Cl. .................................. 73/129; 340/52 A; 324/160
[58] Field of Search ................ 73/121, 128, 129, 130, 73/517 R, 518; 340/52 A, 52 B, 870.38; 324/176, 177, 178, 160; 368/107; 188/1.11, 181 R; 303/91, 93

[56] References Cited

U.S. PATENT DOCUMENTS

| | | | |
|---|---|---|---|
| 2,846,674 | 8/1958 | Wikkenhauser | 340/870.38 |
| 3,958,445 | 5/1976 | Howard et al. | 340/52 A |
| 4,027,753 | 6/1977 | Lantz | 188/181 R |
| 4,214,483 | 7/1980 | Young | 324/160 |
| 4,298,857 | 11/1981 | Robins et al. | 340/52 A |
| 4,337,651 | 7/1982 | Yoshino et al. | 73/129 |
| 4,520,663 | 6/1985 | Moore et al. | 73/129 |

Primary Examiner—Howard A. Birmiel
Assistant Examiner—Robert R. Raevis
Attorney, Agent, or Firm—James B. Raden; William J. Michals

[57] ABSTRACT

A device for determining the rotational speed of a rotating component, in particular of a brake disc (1) of an automotive vehicle brake, the brake disc (1) containing recesses (2) shaped at preferably regular distances and lying opposite to a probe. A contact element (5) is provided as the probe which is adapted to move into abutment on the brake disc (1) and which, when overriding each recess (2), will interrupt an electric circuit comprising an evaluation circuit.

17 Claims, 8 Drawing Figures

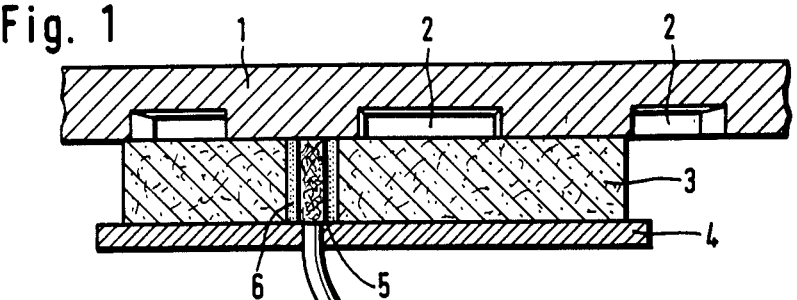
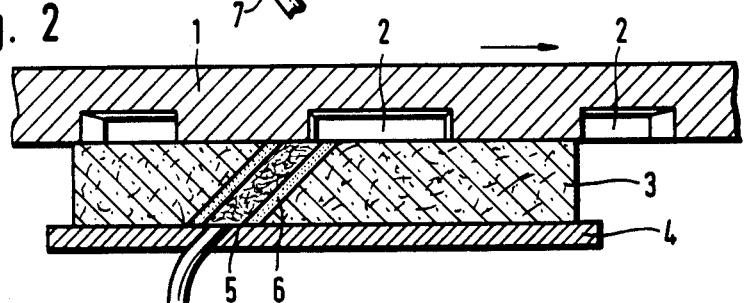
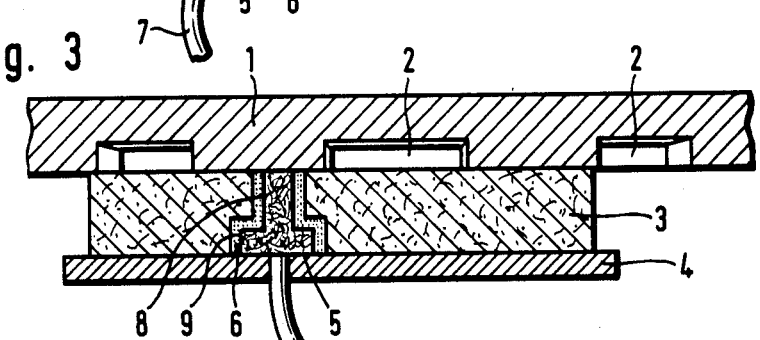
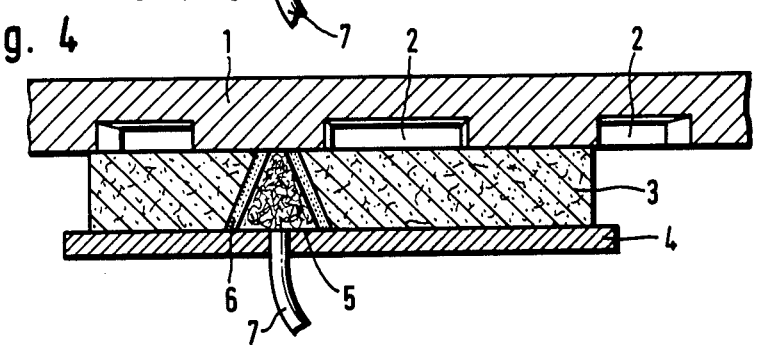

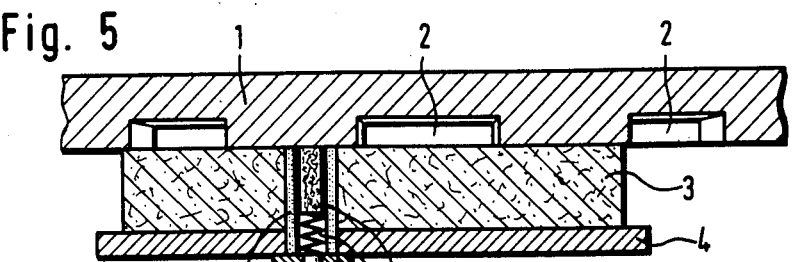
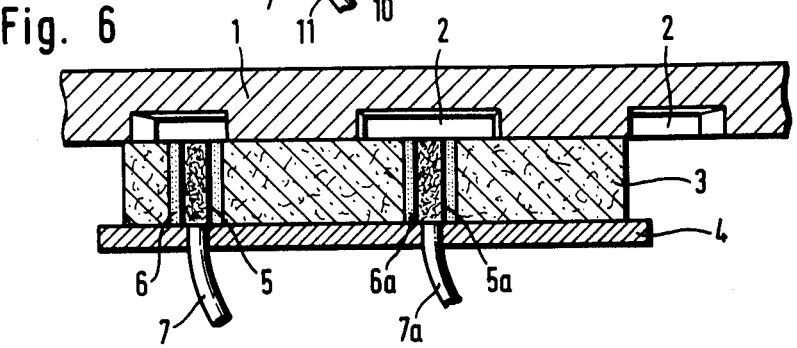
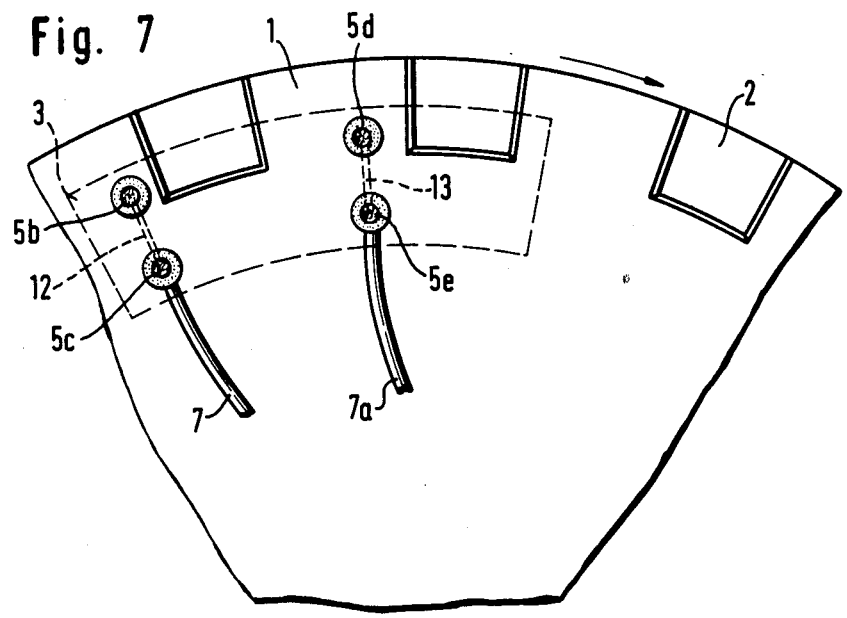

DEVICE FOR THE DETERMINATION OF ROTATIONAL SPEED

BACKGROUND OF THE INVENTION

The present invention relates to a device for determining the rotational speed of a rotating component, in particular of a brake disc of an automotive vehicle brake, the brake disc containing recesses shaped at preferably regular angular distances and lying opposite to a probe.

To determine the wheel speeds in brake systems for automotive vehicles, it is known to furnish a component that is coupled to the rotating wheel with recesses spread regularly over its periphery, and to provide an inductive probe which is placed opposite to these recesses and which, on rotation of the component, supplies an alternating voltage as a result of the variations of the magnetic flux force.

It is a disadvantage in these prior art devices for the determination of the rotational speed of rotating components that the inductive probes are of complicated design and hence entail high manufacturing costs. In addition, it is necessary to mount such inductive probes with relatively small tolerances in order to achieve the desired measurement results.

It is therefore an object of the present invention to provide a device of the type discussed which is of a straightforward design and which precludes adjustment problems during the assembly.

SUMMARY OF THE INVENTION

This object achieved in accordance with the present invention in that, as a probe, a contact element is employed which is movable into abutment on the brake disc and which, when overriding each recess, interrupts an electric circuit comprising an evaluation circuit. The electrically conductive brake disc is electrically conductively connected to the vehicle mass. On rotation of the brake disc, the electric circuit comprising the evaluation circuit is always interrupted when the contact element lies opposite to a recess. The evaluation circuit registers the number of circuit interruptions per unit time and, on the basis thereof, calculates the number of revolutions of the brake disc. In this manner, a probe is obtained which is of low cost and which easily determines the rotational speed with the number of the recesses shaped at the brake disc being predetermined. Since the number of revolutions of the brake disc is identical with that of the wheel to be monitored, a measurement of the rotational speed at the wheel can be easily obtained thereby.

In an advantageous embodiment of the present invention, the contact element is integrated into the friction lining. It is theoretically possible that the contact element can be permanently mounted in abutment on the brake disc by suitable arrangements. In brake slip control apparatus, however, it is necessary to register rotational speed variations only during a braking action so that the contact element is required to be brought into contact with the brake disc only in those cases in which braking takes place. Upon brake application, the friction lining of an automotive vehicle brake is generally pressed against the brake disc so that it is straightforward to integrate the contact element into the friction lining, especially since this obviates the need for any additional support of the contact element. To this end, it is provided that the contact element is of pin-shaped configuration with a substantially uniform cross-section, with the axis being disposed in parallel to the axis of rotation of the brake disc.

A favorable embodiment will be obtained if the axis of the pin-shaped contact element is inclined at an angle in the direction of the movement of the brake disc during forward travel. Shearing of the pin-shaped contact element after having overridden a recess of the brake disc is prevented. Furthermore, an inclined positioning of the contact element provides effective noise attenuation during braking. Moreover, the contact element is designed such that its abutment surface on the brake disc changes as a function of the wear of the friction lining. In a similar embodiment, the evaluation circuit is supplied with electric signals which charge progressive lining wear. The evaluation circuit recognizes such a change of the electric pulses and, when a predeterminable threshold value is exceeded, provides an alarm signal which signifies that a minimum friction lining thickness has been reached. It may also be provided that the cross-section of the contact element changes abruptly a step of the contact element being provided at a point which corresponds to the admissible wear limit of the friction linings. As an alternative, the contact element can be of substantially truncated-cone-shaped configuration.

As the friction lining usually contains electrically conductive materials, it may be expedient to have an insulating layer arranged between the contact element and the material of the friction lining so that disturbing signals caused by the metal parts in the friction lining material are precluded. To ensure good contact between the contact element and the brake disc and a correspondingly reliable signal, the contact element can be loaded in the direction of the brake disc by a compression spring.

In another embodiment a second contact element is arranged in the friction lining, angularly offset in relation to the brake disc, with the contact element allowing control of the current flow leading to the evaluation circuit. To attain unmistakable signals, the contact elements can be located such that recesses of the brake disc are overridden simultaneously.

For precisely recognizing the brake lining wear, the contact elements can be designed as electrically interconnected contact pairs, the resistance between the contact elements of a contact pair being controllable by the wear of the friction lining. For instance, the contact can be normally closed and then interrupted as soon as the minimum lining thickness is reached. In a particularly simple embodiment of the present invention, the friction lining is composed of at least two sectors which are electrically insulated from each other, each sector performing the function of a contact element. There is no need for a special contact element which is advantageous in terms of cost.

Preferably, a metal/sinter material is used as the material for the contact elements. On the other hand, any soft ceramic material is suitable as a material for the insulating layer between the contact element and the material of the friction lining.

BRIEF DESCRIPTION OF THE DRAWING

The present invention will be described in more detail in conjunction with the accompanying drawing wherein:

FIG. 1 is a device for the determination of the rotational speed comprising a pin-shaped contact element disposed vertically to the brake disc's plane;

FIG. 2 is a device comprising a pin-shaped contact element, the center axle of which is inclined towards the axis of rotation of the brake disc;

FIG. 3 is a device comprising a contact element whose cross-section is changed abruptly;

FIG. 4 is a device comprising a contact element of a substantially conical outer contour;

FIG. 5 is a device comprising a spring-loaded contact element;

FIG. 6 is a device comprising two contact elements connected in series;

FIG. 7 is a device wherein two contact pins form one contact element each; and,

DETAILED DESCRIPTION

Figure 8:
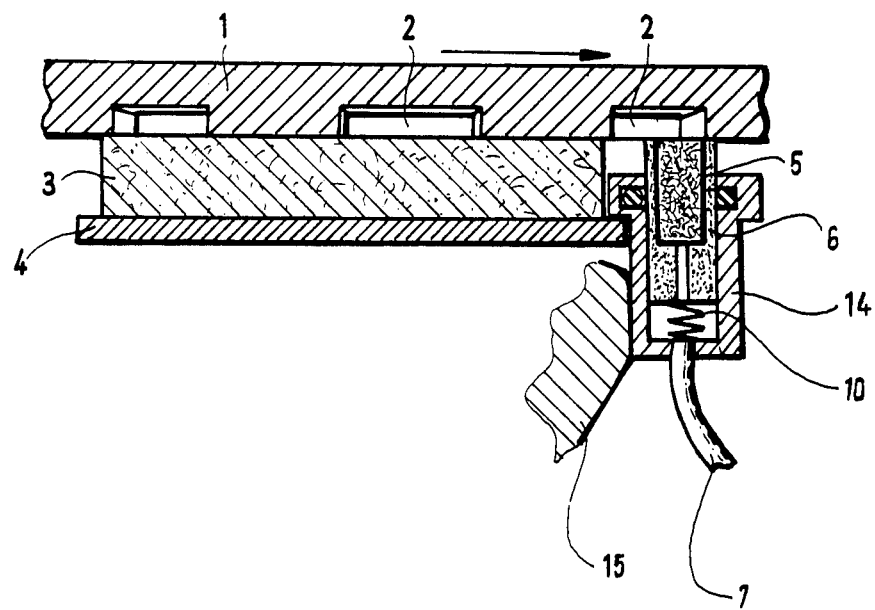
FIG. 8 is a device comprising a contact element separately attached to a brake-actuating member.

In FIG. 1, reference numeral 1 designates a brake disc containing recesses 2, the said recesses 2 being arranged uniformly over the periphery of the brake disc 1 and having the same angular distance to one another, respectively. Furthermore, reference numeral 3 designates in FIG. 1 a friction lining which is connected to a lining carrier 4. Disposed in the friction lining is a contact element 5 which is of substantially cylindrical design and which is placed vertically to the plane of the brake disc 1. The contact element 5 is insulated towards the material of the friction lining 3 by an insulating layer 6. Furthermore, the contact element 5 is in electrical connection with a distributing cable 7 which leads to an evaluation circuit which cannot be gathered from the illustration.

When the brake disc 1 according to FIG. 1 is in rotation, the electric contact element 5 will override the recesses 2 of the brake disc 1 one after the other, and a current flow to the non-illustrated evaluation circuit will be interrupted every time a recess 2 of the brake disc 1 is overriden. The evaluation circuit gathers from the number of current interruptions per time unit, at what rotational speed the brake disc 1 is rotating.

In the embodiment shown in FIG. 2, the pin-shaped contact element 5 is not arranged vertically, but an an angle relative to the plane of the brake disc 1, the axis of the pin-shaped contact element 5 being inclined towards the direction of rotation indicated by the arrow in FIG. 2. A like inclination of the contact element 5 within the friction lining 3 allows to better solve wear problems, and the occurrence of noise in the device will be diminished. Wear of the contact element 5 over its area of contact with disc 1 is decreased because shearing of the contact element 5 after overriding a recess of the brake disc 1 is prevented. Also, the greater surface area of the exposed end of inclined contact element 5, the less the wear of the overall contact element as disc 1 rotates. Further, it has been discovered that the inclined positioning of contact element 5 provides effective noise attenuation during braking.

In the embodiment shown in FIG. 3, the contact element 5 is of step-like design and includes a portion 8 of smaller diameter and a portion 9 of larger diameter. As soon as the cross-sectional surface of the larger portion 9 of the contact element 5 moves into contact with the brake disc 1 due to lining wear, the signal train fed by way of the distributing cable 7 to the evaluation circuit will change, whereby the evaluation circuit recognize that the friction lining 3 is worn out to a minimum. In response thereto, a corresponding signal will be issued by the evaluation circuit indicating inadmissibly great wear of the brake linings to the vehicle driver through corresponding signal devices.

FIG. 4 displays an embodiment in which the contact element 5 substantially is of truncated cone-shaped design, whereby the signals supplied to the evaluation circuit will likewise be influenced with increased lining wear. In this case, a threshold value is preset in the evaluation circuit, in excess whereof an alarm signal will be issued which signals inadmissibly great wear of the friction lining 3.

According to FIG. 5, the pin-shaped contact element 5 is loaded by a compression spring 10 in the direction of the brake disc 1 so that there is always sufficient contact making between the contact element 5 and the brake disc 1. Herein, the compression spring 10 takes support on a spring plate 11 coupled to the lining carrier 4.

The embodiment according to FIG. 6 features two contact elements 5, 5a arranged in friction lining 3 which are connected in series with the evaluation circuit by wires 7, 7a which cannot be seen from the drawing.

This configuration provides a back-up system whereby electrical signals are unmistakenly produced as brake disc 1 rotates when the contact elements 5, 5a are located such that the recesses 2 of the brake disc 1 are overriden by the contact elements simultaneously. A like embodiment is advantageous in particular if it is not safeguarded that the brake disc 1 is in conducting contact with the vehicle mass.

FIG. 7 illustrates an embodiment of the present invention, wherein the contact elements are designed each as contact pairs 5b, 5c; 5d, 5e which are connected electrically—as is indicated by the dotted lines 12, 13. The resistance between the contact elements 5b, 5c; 5d, 5e is controllable by the wear of the friction lining 3.

This embodiment permits precise recognition of brake lining wear, since the resistance between contact elements 5b, 5c or 5d, 5e, is determined by wear of friction lining 3. In the embodiment of FIG. 7, the friction lining 3 is composed of at least two sectors, with contact elements 5b and 5c in one sector, and contact elements 5b and 5e in a second sector. Each sector is electrically insulated from each other.

FIG. 8 shows an embodiment of this invention, wherein a contact element 5 is located on the side of the friction lining 3 which is not in contact with brake disc 1 in a housing 14, the housing 14 being, for example, connected to a brake caliper 15. A like embodiment affords the special advantage that the signal output is not performed exclusively when the brake is actuated. Furthermore, this renders it possible to register the behavior of the contact element 5 with respect to friction and wear irrespective of the behavior of the friction lining 3.

What is claimed is:

1. A device for determining the rotational speed of a rotating component, in particular of a brake disc of an automotive vehicle brake, said brake disc containing recesses shaped at preferably regular angular distances and lying opposite to a probe, wherein a contact element (5) is employed as the probe which is movable into abutment on the brake disc (1) and which, when overriding each recess (2), interrupts an electric circuit comprising an evaluation circuit.

2. A device as claimed in claim 1, wherein the contact element (5) is integrated into a friction lining (3) disposed for movement into and out of contact with the brake disc.

3. A device as claimed in claim 2, wherein the contact element (5) is of pin-shaped configuration with a substantially uniform cross-section with the axis of the contact element extending in parallel to the axis of rotation of the brake disc (1).

4. A device as claimed in claim 3, wherein the contact element (5) is loaded in the direction of the brake disc (1) by a compression spring (10).

5. A device as claimed in claim 2, wherein the axis of the contact element (5) is inclined at an angle in the direction of the movement of the brake disc (1) during forward travel.

6. A device as claimed in claim 2, wherein the contact element (5) is arranged so that its abutment surface on the brake disc (1) changes in electrical resistance in dependence upon the wear of the friction lining (3).

7. A device as claimed in claim 6, wherein the cross-section of the contact element (5) is changed abruptly, a step of the contact element (5) being disposed at the admissible wear limit of the friction lining (3).

8. A device as claimed in claim 6, wherein the contact element (5) is of substantially truncated-cone-shaped configuration.

9. A device as claimed in claim 8, wherein an insulating layer (6) is arranged between the contact element (5) and the material of the friction lining (3).

10. A device as claimed in claim 1, wherein a second contact element (5a) is arranged in the friction lining (3), angularly offset in relation to the brake disc (1).

11. A device as claimed in claim 10, wherein the contact elements (5,5a) are located a specified distance apart such that recesses (2) are in each case overridden simultaneously.

12. A device as claimed in claim 10, wherein the contact elements (5, 5a) are provided as electrically interconnected contact pairs (5b, 5c; 5d, 5e), the resistance between the contact elements of a contact pair being controllable by the wear of the friction lining (3).

13. A device as claimed in claim 10, wherein the friction lining (3) is composed of at least two sectors which are electrically insulated from one another.

14. A device as claimed in claim 10, wherein a metal/-sinter material is the material for the contact elements (5a to 5e).

15. A device as claimed in claim 14, wherein a soft ceramic material is used as material for an insulating layer (6) surrounding said contact elements.

16. A device as claimed in claim 14, wherein the contact element (5) is arranged on the side of the friction lining (3) which is not in contact with the brake disc in a housing (14) which is connected to a brake caliper (15), the contact element (5) being biased in the direction of the brake disc (1).

17. A device as claimed in claim 16, wherein a contact element is accommodated in the housing (14).

* * * * *